Aug. 14, 1928.
R. A. MINSTERMAN
1,680,904
BAKER'S PEEL
Filed June 29, 1927
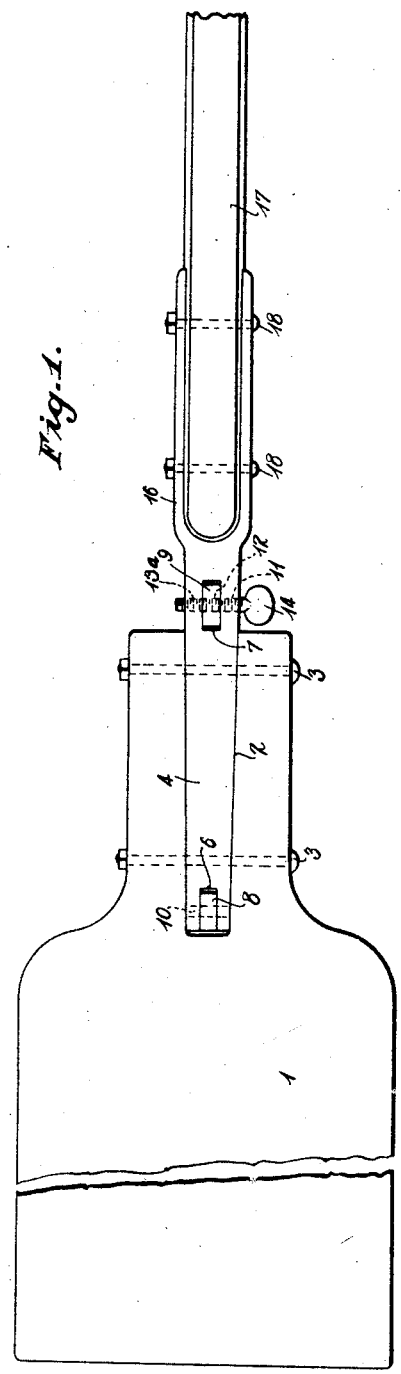
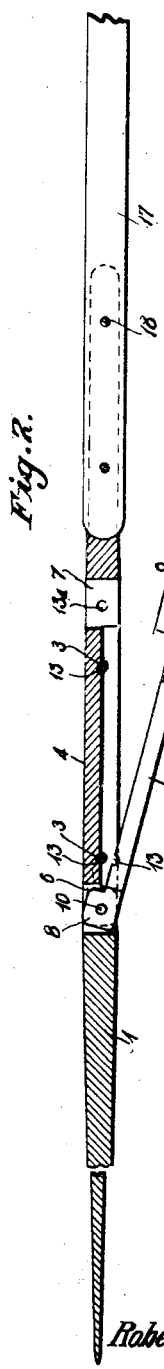
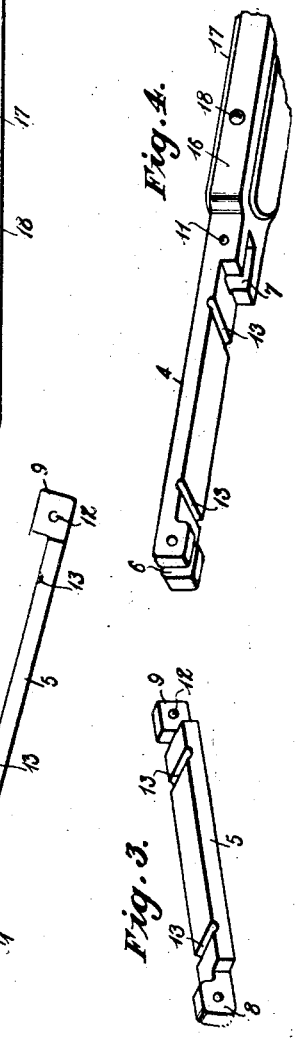
INVENTOR.
Robert A. Minsterman
BY
Knight Bro
ATTORNEYS Patented Aug. 14, 1928.

1,680,904

UNITED STATES PATENT OFFICE.

ROBERT ALBERT MINSTERMAN, OF ELMIRA, NEW YORK.

BAKER'S PEEL.

Application filed June 29, 1927. Serial No. 202,353.

This invention relates to baker's peels and has for its object to provide an improved means for attaching the handle to the peel board.

Due to the conditions to which peel boards are subjected they become scorched or cracked after a short period of use and have to be renewed. Heretofore it has been customary to fit the end of the wooden handle directly into a slot with which the peel board is provided and fasten the parts together by means of bolts. Frequently the end of the handle fitting into the slot was in such condition that it had to be sawed off and the new end planed down to fit the slot and holes bored for the bolts. The subject of my invention is a clamp which fits into the conventional slot provided in the peel board and clamps upon the pins or bolts extending across the slot, the clamp being provided with means for securing the same to the handle. With my improved clamp the exchanging of a peel board is a matter of seconds instead of many minutes as heretofore.

In the accompanying drawing in which I have shown one embodiment of my invention by way of example:

Fig. 1 is a plan view of a baker's peel provided with my improved clamp,

Fig. 2 is a vertical longitudinal section thereof,

Fig. 3 is a perspective view of one member of the clamp, and

Fig. 4 is a perspective view of the other member of the clamp.

A peel board 1 is provided with the usual slot 2 across which extend bolts or pins 3. A clamp consisting of members 4 and 5 is shaped to fit snugly into the slot 2. Slots 6 and 7 provided in member 4 cooperate with tongues 8 and 9 of member 5. The tongue 8 is pivoted in slot 6 by means of a pintle 10. Apertures 11, 12, and 13ª are provided in member 4 and tongue 9 to receive a locking screw 14, the aperture 13ª beng threaded. Members 4 and 5 are grooved at 13 to receive the pins 3. The end of member 4 is forked at 16 so as to slip over the end of a handle 17. The arms of the fork 16 are secured to handle 17 by bolts 18.

In applying the clamp to a new peel board the screw 14 is removed and the members 4 and 5 swung apart. It will be noted that in the embodiment shown the clamp is tapered toward its pivoted end and it is therefore necessary to hold the peel board at right angles to the handle when inserting the free end of member 5 through slot 2 behind the inner bolt 3. When the hinge 10 is within the slot 2 the peel board can be swung into alinement with handle 17 and members 4 and 5 brought together and locked by screw 14.

The above described clamp is strong and rigid and is of such form as to be applicable to standard peel boards without any fitting or adjustment. Numerous modifications falling within the scope of the subjoined claims will be apparent to those skilled in the art.

Having described my invention,

I claim:

1. In a baker's peel, a slotted peel board, a plurality of pins extending across said slot, a handle, and a clamp for connecting said peel board to said handle comprising a pair of clamping members adapted to fit within said slot and clamp between them said pins, and means for securing said clamp to said handle.

2. In a baker's peel, a slotted peel board, a plurality of pins extending across said slot, a handle, and a clamp for connecting said peel board to said handle comprising a pair of pivoted clamping members adapted to fit within said slot and clamp between them said pins, and means for securing said clamp to said handle.

3. In a baker's peel, a slotted peel board, a plurality of pins extending across said slot, a handle, and a clamp for connecting said peel board to said handle comprising a pair of clamping members adapted to fit within said slot and clamp between them said pins, and means for securing one of said clamping members to said handle.

4. In a baker's peel, a slotted peel board, a plurality of pins extending across said slot, a handle, and a clamp for connecting said peel board to said handle comprising a pair of clamping members adapted to fit within said slot and clamp between them said pins, tongues on one of said clamping members, slots on the other clamping member adapted to receive said tongues, means for pivoting one of said tongues in its cooperating slot, means for locking the other tongue in its cooperating slot, and means for securing said clamp to said handle.

5. In a baker's peel, a slotted peel board, a plurality of pins extending across said slot, a handle, and a clamp for connecting said peel board to said handle comprising a pair of clamping members adapted to fit within said slot and clamp between them said pins, said clamping members being grooved to receive said pins.

6. In a baker's peel, a slotted peel board, a plurality of pins extending across said slot, a handle, and a clamp for connecting said peel board to said handle comprising a pair of clamping members pivoted together at one end, said pivoted end of said clamping members being adapted to fit within said slot and clamp upon said pins, means for locking the unpivoted ends of said clamping members together, and means for securing said clamp to said handle.

The foregoing specification signed at Elmira, New York, this 28th day of May, 1927.

ROBERT ALBERT MINSTERMAN.